US010117286B1

(12) United States Patent
Jorgovanovic (10) Patent No.: US 10,117,286 B1
(45) Date of Patent: Oct. 30, 2018

(54) SYSTEM FOR DISTRIBUTING DATA USING MULTIPLE COMMUNICATION CHANNELS (71) Applicant: AMAZON TECHNOLOGIES, INC., Seattle, WA (US)

(72) Inventor: Milos Jorgovanovic, Mountain View, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 15/708,950

(22) Filed: Sep. 19, 2017

(51) Int. Cl.
*H04W 76/15* (2018.01)
*H04B 17/318* (2015.01)
*H04W 24/08* (2009.01)
*H04W 76/14* (2018.01)
*H04W 4/80* (2018.01)
*H04W 92/10* (2009.01)
*H04W 84/12* (2009.01)

(52) U.S. Cl.
CPC .......... *H04W 76/15* (2018.02); *H04B 17/318* (2015.01); *H04W 4/80* (2018.02); *H04W 24/08* (2013.01); *H04W 76/14* (2018.02); *H04R 2420/07* (2013.01); *H04W 84/12* (2013.01); *H04W 92/10* (2013.01)

(58) Field of Classification Search
CPC .............................. H04W 76/14; H04W 76/15
See application file for complete search history.

(56) References Cited

U.S. PATENT DOCUMENTS

2009/0258607 A1* 10/2009 Beninghaus ......... H04B 1/3805
455/77
2013/0260672 A1* 10/2013 Patil .................... H04M 1/7253
455/7

* cited by examiner

Primary Examiner — Tuan H Nguyen
(74) Attorney, Agent, or Firm — Lindauer Law, PLLC (57) ABSTRACT Described are techniques for distributing audio data to multiple devices for a synchronized output in a manner that reduces congestion and interference with a first frequency band of a network. A first audio device receives audio data using the first frequency band, via an access point, then transmits the data to a second audio device using a different protocol. The second audio device may then distribute the audio data to other devices using a different frequency band. The two devices selected for use distributing the audio data may be determined based on signal quality for communications between the devices, data throughput between the first audio device and the access point, counts of devices that may receive data from the second device, and signal quality and other metric data associated with communications by the second audio device.

20 Claims, 5 Drawing Sheets

SYSTEM FOR DISTRIBUTING DATA USING MULTIPLE COMMUNICATION CHANNELS

BACKGROUND

When multiple devices communicate using a single frequency band of a Wi-Fi network, or other communication channels common to the multiple devices, the performance of one or more of the devices may be diminished.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Multiple devices within a home or other environment may communicate via a Wi-Fi network. For example, a device may transmit data to and receive data from other devices via one or more wireless access points. Many access points transmit and receive data using a single band of those available for use by a Wi-Fi network, such as a 2.4 gigahertz (GHz) band or 5 GHz band. Devices that communicate, directly or indirectly, with the access point may therefore also send and receive data using the same band. If a device includes only a single wireless radio, then outgoing transmissions by the device, to the access point, or to other devices, may also use the same band as the access point. When multiple devices in an environment simultaneously utilize the same band, the network congestion associated with this use may hinder the operation of one or more of the devices. For example, in many environments, a 2.4 GHz Wi-Fi band may be from 40 to 60 percent congested, or more. The lack of capacity associated with the 2.4 GHz band may reduce the quality of data-intensive operations that utilize the network, such as simultaneous transmission of audio and video data to various devices. For example, generation of a synchronized audio output using multiple audio devices may include distribution of audio data to numerous devices, as well as transmission of time synchronization commands, audio commands, and so forth, which may utilize a significant quantity of network resources and interfere with the performance of other devices. Continuing the example, if multiple audio devices are used to generate a synchronized output while one or more video devices that utilize the same network resources are used to stream high-resolution video content, the quality of one or both of the audio output or video output may be degraded due to the limited network resources.

While other Wi-Fi bands, such as a 5 GHz band, may be less congested than a 2.4 GHz band, devices that have only a single wireless radio and are connected to an access point via a channel of a 2.4 GHz band may be unable to simultaneously use the 5 GHz band. However, in some cases, a device may be configured to use other communication protocols, such as Bluetooth, Bluetooth Low Energy, ZigBee and so forth.

Described in this disclosure are techniques for distributing audio data to multiple audio devices in a manner that reduces interference with other devices that share network resources with the audio devices. While the present disclosure describes various implementations relating to use of audio devices to distribute audio data for generation of a synchronized audio output, other implementations may include the distribution of other types of data to other devices, such as the distribution of video data to video devices. When a first band (e.g., a 2.4 GHz band) of a Wi-Fi network, or another type of communication channel, is congested, a first audio device that receives audio data via a channel of the first band may transmit the audio data to a second audio device using a different protocol, such as a Bluetooth communication link. The second device that receives the transmission using the different protocol may then transmit the audio data to one or more other audio devices using a channel associated with a second band (e.g., a 5 GHz band) of the Wi-Fi network, or other type of communication channel. Using the second protocol to transmit the audio data from a first device that receives the data via the first band to a second device that transmits the data using the second band, then distributing the audio data using the second band may reduce the use of network resources associated with the first band. Additionally, using the second protocol to transmit the audio data from the first device to the second device may enable two devices that each have a single wireless radio, and that may be unable to simultaneously utilize two Wi-Fi bands, to receive data via an access point using a first band, then distribute the data to other devices using a second band.

A group of audio devices that communicate using a first protocol, such as by accessing a Wi-Fi network, may include pairs of audio devices in which each member of a pair is capable of communicating with the other member using a second protocol, such as Bluetooth. A Wi-Fi protocol may include a protocol compliant with at least a portion of Institute of Electrical and Electronics Engineers IEEE specification 802.11. A Bluetooth protocol may include a protocol compliant with at least a portion of one or more of Institute of Electrical and Electronics Engineers (IEEE) specification 802.15.1 or a standard promulgated by the Bluetooth Special Interest Group. In some implementations, existing device data may indicate pairs of devices capable of communicating using the second protocol. In other implementations, pairing data may be determined by the audio devices or another computing device in communication therewith. Pairing data may indicate devices that are capable of communicating with one another using the second protocol. For example, each audio device within a group of audio devices may initiate a Bluetooth pairing mode to determine other audio devices that are discoverable, the signal strength of Bluetooth communications between various pairs of devices, and so forth. In some cases, a particular audio device may be capable of forming a pair of devices with multiple other audio devices. For example, a first device may be within range of Bluetooth communication with two or more other audio devices. Each pair of devices capable of Bluetooth communication may include a first device that is useable to receive audio data from the access point via a first band (a "receiving master device"), which transmits the audio data to a second device (a "distributing master device") via a different protocol. The distributing master device may distribute the audio data to other devices using a second band. In some implementations, one or more pairs of devices may be excluded from use as a distributing master device for distributing data to other devices if the signal strength for Bluetooth communications between the receiving master device and the distributing master device is less than a threshold signal strength. Signal strength between two devices may include a measured peak or instantaneous value, or an average value, such as a Received Signal Strength Indicator (RSSI) determined by one or both devices of a pair. Signal strength may be measured as a calibrated or unit value, such as decibel-milliwatts (dBm), or a unitless measurement, such as a numerical eight-bit value ranging from 0 to 255.

After determining pairs of devices that may communicate using the second protocol, data throughput values associated with communication between the access point and each of the devices included in a pair may be determined. A data throughput value for a device may be indicative of a data transfer rate for communications between the access point and the device. In other implementations, one or more other signal metric values, such as RSSI, a signal to noise ratio (SNR), a packet error rate (PER), a received channel power indicator (RCPI), a modulation and coding scheme (MCS), and so forth may be determined. Each device having a data throughput value, or other metric value, for communication with the access point that exceeds a threshold value may be used as a receiving master device to receive audio data from the access point, such as via a 2.4 GHz Wi-Fi band. For example, a threshold data transfer rate may indicate a minimum data throughput that would be used by a device for concurrent receipt of data via a Wi-Fi communication link and transmission of the data via a Bluetooth communication link. The received audio data may then be transmitted via Bluetooth, or another protocol, to a paired device, which may in turn distribute the audio data to other devices. The threshold data throughput value or data transfer rate may be selected to ensure that a receiving master device includes sufficient bandwidth for streaming of audio data. For example, a data transfer rate, such as 1 MB/s, may be selected as a rate that is sufficient for receiving audio data for generation of an audio output having a minimum quality. A minimum quality of an audio output may correspond to a minimum rate of audio samples, a minimum count of bits per sample, or a minimum rate or count of dropped packets of audio data. In some implementations, the threshold value may be set as double the selected data transfer rate due to the receiving master device functioning to both receive the audio data via a Wi-Fi communication link and transmit the audio data to a paired device using a Bluetooth communication link. Devices having data throughput values that are less than the threshold may be excluded from use as a receiving master device.

After determining a subset of audio devices that have a sufficient data throughput value for use as a receiving master device, the other audio devices capable of communicating with the subset of audio devices via Bluetooth, or another protocol, may be analyzed to determine the best audio device for use as a distributing master device. For example, a distributing master device may be configured to provide audio data to multiple other devices via a multicast transmission. Example implementations for forming a group of audio devices in which an audio distribution master device communicates audio data to multiple slave devices via a multicast transmission are described in U.S. patent application Ser. No. 15/246,070, filed Aug. 24, 2016, entitled "System for Configuring Distributed Audio Output using a Designated Audio Device", U.S. patent application Ser. No. 15/651,450, filed Jul. 17, 2017, entitled "System for Distributing Data Using a Designated Device", and U.S. patent application Ser. No. 15/421,014, filed Jan. 31, 2017, entitled "System for Distributed Audio Output Using Designated Audio Devices". Application Ser. Nos. 15/246,070; 15/651,450; and 15/421,014 are incorporated by reference herein in their entirety. Other example implementations for distributing audio data to a group of audio devices using multicast transmissions are described in U.S. patent application Ser. No. 15/357,579, filed Nov. 21, 2016, entitled "System for Distributing Audio Output Using Multiple Devices", which is incorporated by reference herein in its entirety. In some cases, a group of audio devices may communicate audio data using a combination of multicast transmissions and transmissions via an access point. Example implementations for forming such a group of audio devices are described in U.S. patent application Ser. No. 15/373,677, filed Dec. 9, 2016, entitled "System for Configuring Audio Devices to Distribute Audio Data", which is incorporated by reference herein in its entirety.

For example, a distributing master device may be selected based on communication data, indicative of a count of other devices accessible by the distributing master device. Continuing the example, the count of devices accessible by a distributing master device may exceed one or more counts of devices accessible by other devices. A device that is capable of transmitting data to the largest number of other devices within a group may be the most suitable device for use as a distributing master device. In other implementations, selection of a distributing master device may be based in part on communication data, such as signal strength values associated with communications to other devices, data transfer rates associated with communications to other devices, and so forth.

After determining a distributing master device, each of the receiving master devices that is able to communicate with the distributing master device via the second protocol is analyzed. The receiving master device having the greatest signal strength for communications with the distributing master device may be used to receive audio data, via the access point, using a first band of the first protocol. For example, if a first signal strength value associated with communication between the distributing master device and a first device is greater than a second signal strength value associated with communication between the distributing master device and a second device, the first device may be used as a receiving master device. In some implementations, if a signal strength associated with Bluetooth communication signals between a pair of devices does not exceed a threshold signal strength that corresponds to a minimum data transfer rate for generating an audio output having a minimum quality, one or both devices of the pair may be excluded from use as a receiving master device or distributing master device. For example, if the signal strength associated with the transmission of communication signals between devices is insufficient to support a minimum data transfer rate that enables an audio output to be provided with a selected minimum bitrate, minimum sample size, or minimum packet loss during transmission of the audio data between devices, the pair of audio devices may be unsuitable for use as receiving and distributing master devices. The selected receiving master device may transmit the audio data to the distributing master device using the second protocol. In some implementations, communications between the receiving master device and distributing master device may use multiple communication links. For example, a receiving master device may provide audio data to a distributing master device via a first Bluetooth communication link, and may provide control commands or other types of data via an additional concurrent communication link, such as a Bluetooth Low Energy or second Bluetooth communication link. A Bluetooth low energy protocol may correspond at least in part to one or more standards promulgated by the Bluetooth Special Interest Group, such as the Bluetooth Core Specification Version 4.0 or the Bluetooth 5 Specification. Continuing the example, a second Bluetooth communication link may be used to transmit commands to control the transfer of data or to control an audio output generated by one or more of the devices. In some cases, the first communication link and the additional concurrent communication link may be used to transmit data simultaneously. For example, a first communication link may be used to transmit audio or video data to devices for generation of an output while a second communication link may be used to transmit messages that include non-audio data or non-video data, such as time synchronization commands, control commands, configuration commands, and so forth. In some implementations, the distributing master device may transmit commands received from the receiving master device to one or more other devices. The distributing master device may transmit the audio data to one or more other audio devices using a second frequency band of the first protocol. In some implementations, if one or more particular audio devices are unable to receive audio data from the distributing master device, the particular audio device(s) may instead receive the audio data via the access point using the first band. In other implementations, a second distributing master device and receiving master device may be determined and used to transmit audio data to one or more of the devices that did not receive the audio data from the first distributing master device.

Figure 1:
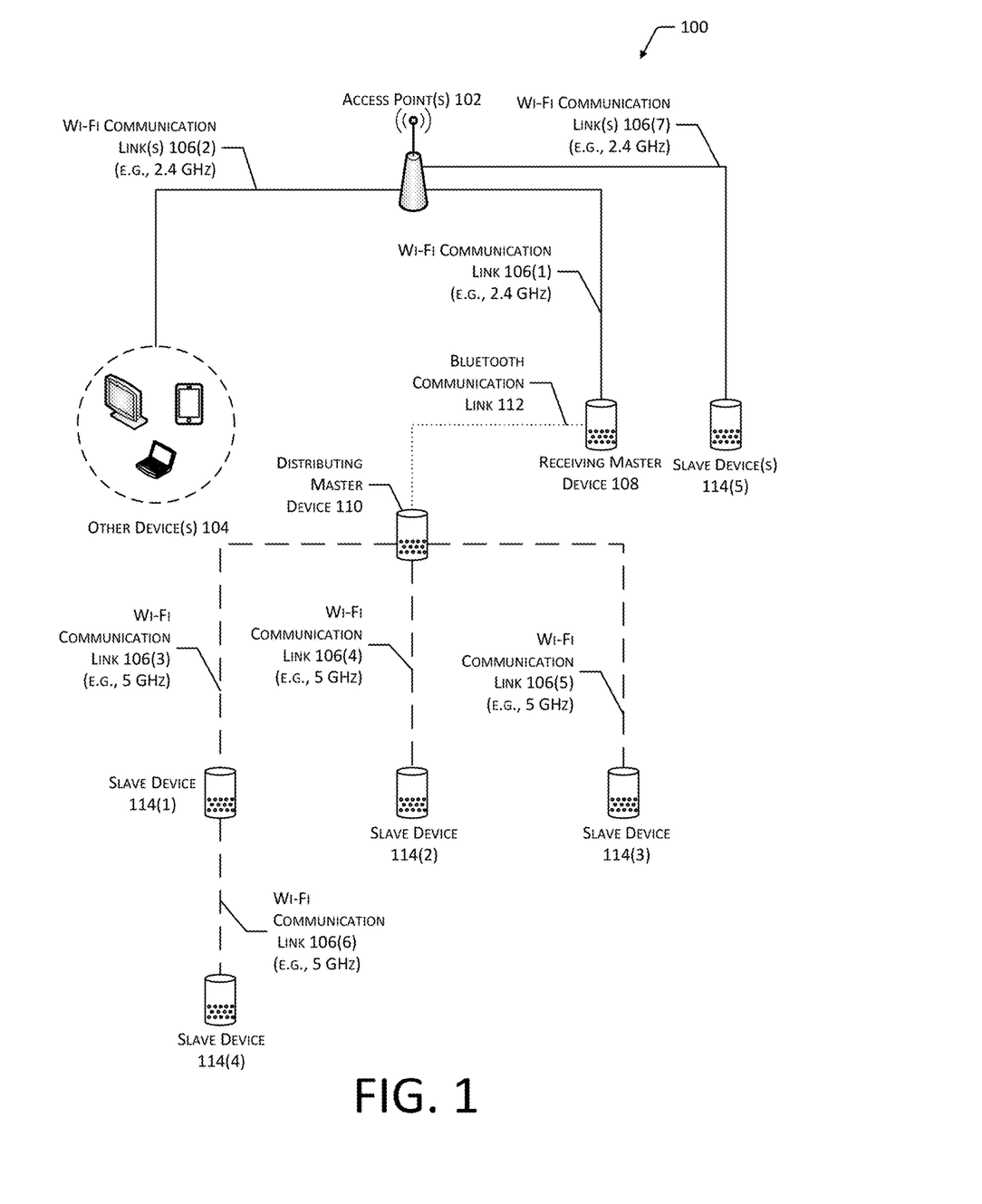
FIG. 1 depicts an implementation of a system for distributing data to multiple devices using different protocols and frequency bands than those associated with an access point.

FIG. 1 depicts an implementation of a system 100 for distributing data to multiple devices using different protocols and bands (e.g., frequency ranges) than those associated with an access point 102. Multiple audio devices, as well as other types of devices, may transmit and receive data via a Wi-Fi network. For example, a computing device may transmit data to, and receive data from, one or more remote computing devices via a communication link with one or more access points 102. While FIG. 1 depicts a single access point 102, a network may include any number of access points, range extenders, or other types of network devices configured to transmit and receive data to and from computing devices associated with the system 100 and remote computing devices. FIG. 1 depicts seven audio devices associated with the system 100, at least a subset of which may be used to provide a synchronized audio output. While FIG. 1 depicts each audio device as a freestanding speaker device, in other implementations, the audio devices may include any type of device that is capable of receiving audio data and generating an audio output, including without limitation, a personal computer, smartphone, portable computer, smart television, automotive computing device, and so forth. Additionally, while FIG. 1 depicts seven audio devices, other implementations may include any number of audio devices.

A first audio device may function as an audio distribution master device that receives audio data via the access point 102. The audio distribution master device may then transmit the audio data to one or more other audio devices via a multicast transmission, as described for example in U.S. patent application Ser. No. 15/421,014, incorporated by reference previously. In other cases, the audio distribution master device may transmit audio data to one or more audio devices via communication links between each audio device and the access point 102, as described in U.S. patent application Ser. No. 15/245,897, filed Aug. 24, 2016, entitled "System for Configuring Distributed Audio Output Using an Access Point", which is incorporated by reference herein in its entirety. In still other cases, a group of audio devices may distribute data using a combination of multicast transmissions and transmissions via an access point 102, as described in U.S. patent application Ser. No. 15/373,677, incorporated by reference previously.

However, in addition to transmission of audio data, time synchronization commands, control commands, and so forth associated with the audio devices, a Wi-Fi network may also be used to transmit and receive data associated with one or more other devices 104, such as video devices, communication devices, and other types of computing devices. In some cases, simultaneous use of multiple devices associated with an access point 102 may utilize a large portion of network resources available to a network. For example, operation of multiple audio devices to produce a synchronized audio output, simultaneous with the streaming of high-resolution video content by a smart television, may cause one or more operations associated with the network to fail or for the quality of one or more operations to be reduced. Continuing the example, if each of the depicted audio devices shown in FIG. 1, as well as one or more other devices 104, each communicate with the access point 102 via Wi-Fi communication links 106 associated with a particular band, such as a 2.4 GHz band, the frequency band may become congested and unable to support all of the network traffic associated with each device.

In some implementations, a particular audio device may be used as a software-based access point to distribute audio data to other devices, such as via a multicast transmission. In such as case, the particular audio device may distribute the audio data using a different band (e.g., a 5 GHz band) than the band used by the access point 102. Use of a different band to distribute data to the audio devices may enable the audio devices to provide a synchronized audio output that is not affected by the interference or congestion associated with the first band. Additionally, use of a different band by the audio devices may reduce the effect of the traffic generated by the audio devices on the other devices 104 that communicate with the access point 102 using the first band. However, in some cases, an audio device that includes a single wireless radio may not be configured to receive audio data from an access point 102 using a first Wi-Fi band, then transmit the audio data to other devices using a second Wi-Fi band. As described previously, a pair of audio devices that communicate using a different protocol, such as Bluetooth, may be used for this purpose. Specifically, a receiving master device 108 may receive audio data from the access point 102 via a first band of the Wi-Fi network, then transmit the audio data to a distributing master device 110 via one or more Bluetooth communication links 112. The distributing master device 110 may then transmit the audio data to one or more other audio devices via Wi-Fi communication links 106 associated with a second band.

Specifically, FIG. 1 depicts the receiving master device 108 in communication with the access point 102 via a first Wi-Fi communication link 106(1). One or more other devices 104 may also communicate with the access point 102 via one or more second Wi-Fi communication links 106(2). The first Wi-Fi communication link 106(1) and the second Wi-Fi communication link(s) 106(2) may be associated with a first Wi-Fi band, such as a 2.4 GHz band. The receiving master device 108 may receive audio data via the Wi-Fi communication link 106(1) with the access point 102, using the first band. The receiving master device 108 may then transmit the audio data to the distributing master device 110 via the Bluetooth communication link 112. For example, the Bluetooth communication link 112 may also be associated with a 2.4 GHz band, but may be used to transmit data between the receiving master device 108 and the distributing master device 110 without transmitting data via the access point 102 or other devices 104 associated with the Wi-Fi network. The distributing master device 110 may function as a software-based access point operable to transmit audio data to one or more other audio devices, referred to as slave devices 114. For example, FIG. 1 depicts the distributing master device 110 in communication with a first slave device 114(1) via a third Wi-Fi communication link 106(3), which may be associated with a different band than that used by the access point 102, such as a 5 GHz band. The distributing master device 110 is also shown in communication with a second slave device 114(2) via a fourth Wi-Fi communication link 106(4) and with a third slave device 114(3) via a fifth Wi-Fi communication link 106(5). The fourth Wi-Fi communication link 106(4) and the fifth Wi-Fi communication link 106(5) may also be associated with a Wi-Fi band that differs from that used by the access point 102.

In some implementations, a slave device 114 may be unable to receive data from the distributing master device 110, such as due to the distance or placement of the slave device 114 relative to the distributing master device 110. In some cases, a slave device 114(4) may receive data from another slave device 114(1), such as via a unicast or multicast transmission. For example, FIG. 1 depicts the first slave device 114(1) in communication with a fourth slave device 114(4) via a sixth Wi-Fi communication link 106(6). The sixth Wi-Fi communication link 106(6) may be associated with the second band used by the distributing master device 110, the first band used by the access point 102, or with a different band. In other cases, a slave device 114(5) may be unable to receive data from the distributing master device 110 or any of the other audio devices. In such a case, the slave device 114(5) may receive audio data from the receiving master device 108 via the access point 102. For example, FIG. 1 depicts a fifth slave device 114(5) in communication with the access point 102 via a seventh Wi-Fi communication link 106(7). The seventh Wi-Fi communication link 106(7) may be associated with the first band used by the access point 102. After receiving audio data from a source, via the access point 102, the receiving master device 108 may transmit the audio data to the slave device 114(5) using the seventh Wi-Fi communication link 106(7).

Thus, in the system 100 shown in FIG. 1, the distributing master device 110 and four of the slave devices 114 may receive audio data without utilizing a communication link with the access point 102, and without utilizing the Wi-Fi band associated with the access point 102. By enabling multiple audio devices to utilize a band other than that used by the access point 102, traffic associated with the first band may be reduced, which may improve the performance the devices 104 that communicate using the access point 102. Additionally, performance of the audio devices may be improved by reducing the effect on the distribution of audio data caused by traffic associated with the first band.

Figure 2:
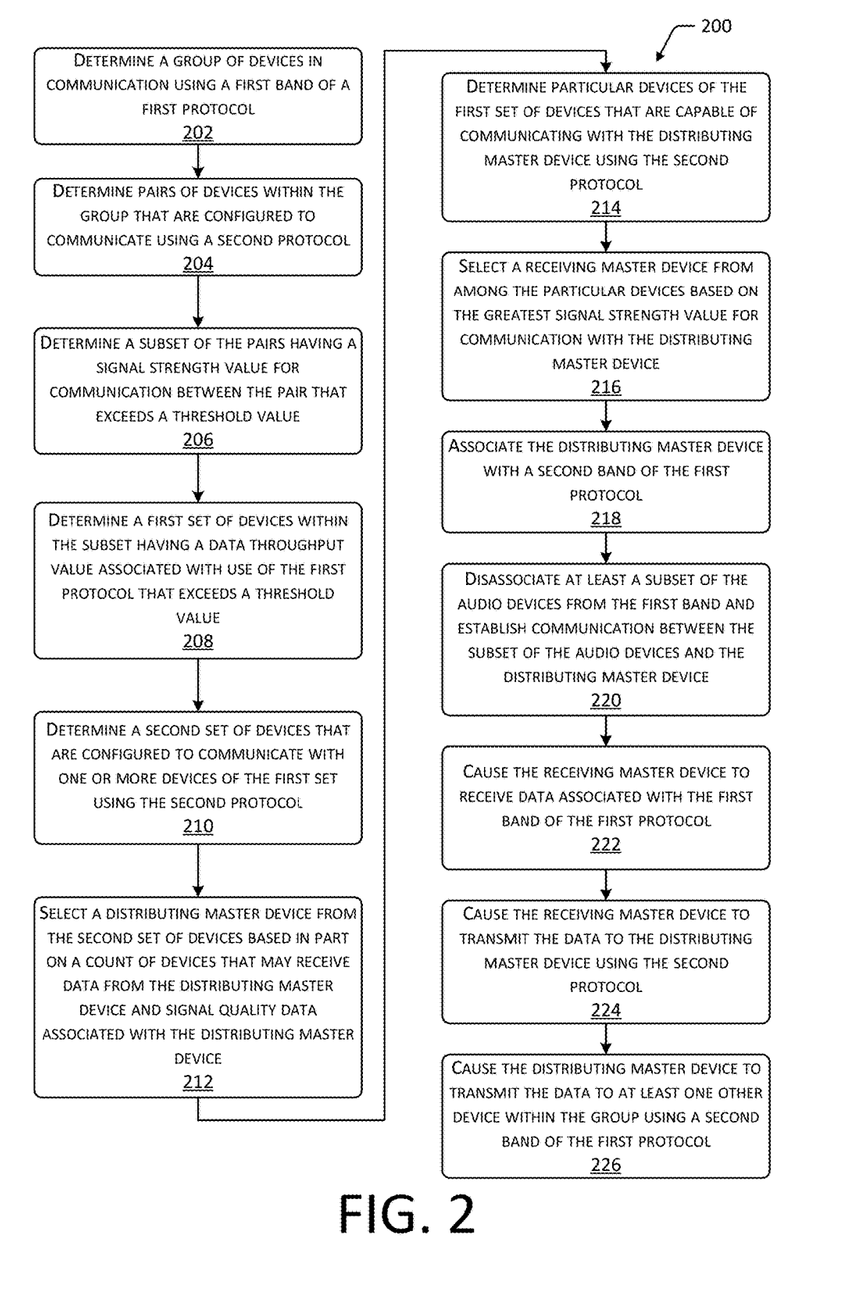
FIG. 2 is a flow diagram illustrating a method for determining a pair of devices for use distributing data to other devices using a frequency band that differs from the frequency band associated with receipt of the data.

FIG. 2 is a flow diagram 200 illustrating a method for determining a pair of devices for use distributing data to other devices using a band that differs from the band associated with receipt of the data. At 202, a group of devices that are in communication using a first band of a first protocol may be determined. For example, multiple devices may communicate using a Wi-Fi network associated with one or more access points 102. The access point 102 and devices that communicate via the access point 102 may use a selected band of frequencies used by the Wi-Fi network, such as a 2.4 GHz band. The group of devices may include audio devices, video devices, or other types of computing devices. For example, a command may be received from a user to initiate playback of a song or other audio data using a selected group of audio devices, such as all devices within a selected room or floor of a home, or all devices within a building. Device group data may indicate particular audio devices associated with the command. For example, particular audio devices may be associated with a "downstairs" group. In some cases, an audio device may be associated with more than one group of devices. For example, an audio device may be associated with a "kitchen" group, a "downstairs" group, and a "whole home" group.

At 204, pairs of devices within the group that are configured to communicate using a second protocol may be determined. For example, in addition to communicating using a Wi-Fi network, one or more devices within the group may also be configured to communicate using Bluetooth, Bluetooth Low Energy, ZigBee, or other protocols. In some implementations, the device group data or other data associated with the devices may indicate the pairs of devices configured to communicate using the second protocol. In other implementations, pairing data indicative of the devices that are capable of communicating with one another using the second protocol may be determined by the devices or by another computing device in communication therewith. For example, the devices may initiate a Bluetooth pairing mode to enable one or more of the devices to discover other devices with which Bluetooth communication links 112 may be established. In some cases, a device may be capable of communicating using the second protocol with multiple other devices. For example, a particular audio device may be within range to initiate Bluetooth communications with multiple other audio devices. Each possible pair of devices may be eligible to function as a receiving master device 108 and distributing master device 110, as described with regard to FIG. 1.

At 206, signal strength values for communication between at least a portion of the pairs of devices may be determined. At least a subset of the pairs having a signal strength value for communication between the pair that exceeds a threshold signal strength value may be determined. Device pairs having a signal strength value that exceeds the threshold signal strength value may remain eligible to function as the receiving master device 108 and distributing master device 110, while device pairs having a signal strength value lower than the threshold signal strength value may not be suitable for use as the receiving master device 108 and distributing master device 110. For example, two devices positioned ten meters from one another may achieve a RSSI value of −80 for Bluetooth communications, while two devices positioned closer to one another may achieve a RSSI value of −20. A threshold value for the RSSI of Bluetooth communications may be −70, which may cause the first pair of devices to be excluded from use as the receiving master device 108 and distributing master device 110. In other implementations, other signal quality metrics, such as RCPI, SNR, PER, data throughput, physical data rate, and so forth may be determined in addition to or in place of a RSSI value.

At 208, data throughput values for at least a portion of the subset of devices, determined at 206, may be determined. A first set of devices within the subset may have data throughput values, associated with use of the first protocol, that exceed a threshold data throughput value. For example, for each audio device determined at 206, a data throughput value associated with communication via an access point 102 may be determined. If the data throughput value exceeds a selected threshold data throughput value for a given audio device, then the audio device may be suitable for use as a receiving master device 108. If the data throughput value for communication with the access point 102 does not exceed the threshold data throughput value, the device may be excluded from use as a receiving master device 108. In some implementations, the threshold data throughput value may be selected based on a data throughput rate used for streaming of audio data. For example, a nominal minimum data transfer rate of 1 MB/s may be selected for use streaming audio data. Because the receiving master device 108 both receives the audio data via a first protocol and transmits the audio data via a second protocol, the threshold data throughput value may be set to double the nominal data transfer rate.

At 210, after determining a first set of devices that are eligible for use as receiving master devices 108, a second set of devices configured to communicate with the first set using the second protocol may be determined. For example, for each device determined at 208, one or more corresponding devices capable of establishing a Bluetooth communication link 112 with the device may have been determined at 204. Each corresponding device that was not excluded from use at 206 may be included in the second set of devices determined at 210.

At 212, a distributing master device 110 may be selected from the second set of devices. The distributing master device 110 may be selected based in part on a count of devices that may receive data form the distributing master device 110, and signal quality data associated with the distributing master device 110. For example, a device that is capable of transmitting data to a large number of other devices in an environment may be more suitable for use as a distributing master device 110 than devices that communicate with a smaller number of other devices. Similarly, a device having large RSSI values or other indicators of signal strength or quality when communicating with multiple other devices may be more suitable for use as a distributing master device 110 than devices that achieve a lower signal quality. For example, at 212, one or more of the methods for selecting an audio distribution master device described in U.S. patent application Ser. No. 15/421,014, incorporated by reference previously, may be used to select the distributing master device 110.

At 214, after determining a distributing master device 110, particular devices of the first set, determined at 208, that are capable of communicating with the distributing master device 110 using the second protocol may be determined. For example, at least one device determined at 208 may be capable of establishing a Bluetooth communication link 112 with the distributing master device 110 determined at 212. In some cases, multiple devices may be capable of establishing a Bluetooth communication link 112 with the distributing master device 110.

At 216, a receiving master device 108 may be selected from among the devices determined at 214, based on the greatest signal strength value for communication with the distributing master device 110. For example, if multiple devices are capable of establishing a Bluetooth communication link 112 with the distributing master device 110, a RSSI value or other indicator of signal quality for communications between the distributing master device 110 and each of the devices capable of establishing a Bluetooth communication link 112 therewith may be determined. The device having the greatest signal quality with the distributing master device 110 may be selected for use as the receiving master device 108.

At 218, the distributing master device 110, determined at 212, may be associated with a second band of the first protocol. For example, the distributing master device 110 may be configured to function as a software-based access point that transmits data to one or more other audio devices using a band that differs from the band used by the access point 102. Continuing the example, the access point 102 may be associated with a 2.4 GHz band of a Wi-Fi network, while the distributing master device 110 is configured to transmit data using a 5.0 GHz band. At 220, at least a subset of the audio devices may be disassociated from the first band and may establish communication with the distributing master device 110, such that the subset of audio devices may receive data from the distributing master device 110 using second band rather than from the access point 102 using the first band. For example, communication links between the subset of the audio devices and an access point 102 may be terminated, and communication links between the subset of audio devices and the distributing master device 110 may be established.

At 222, the receiving master device 108 may be caused to receive data associated with a first band of the first protocol. For example, the receiving master device 108 may communicate with an access point 102 via a Wi-Fi communication link 106 associated with a 2.4 GHz band, and may receive data from the access point 102 using the Wi-Fi communication link 106. However, if the receiving master device 108 possesses a single wireless radio, the receiving master device 108 may not be configured to transmit the data to other devices using a different Wi-Fi band.

Therefore at 224, the receiving master device 108 may be caused to transmit the data to the distributing master device 110 using the second protocol. For example, after receiving the data from the access point 102, the receiving master device 108 may transmit the data to the distributing master device 110 using a Bluetooth communication link 112. In some implementations, multiple communication links may be established between the receiving master device 108 and distributing master device 110. For example, a first Bluetooth communication link 112 may be used to transmit audio data from the receiving master device 108 to the distributing master device 110, while an additional concurrent communication link, such as a second Bluetooth communication link 112 or a Bluetooth Low Energy communication link may be used to transmit commands associated with transmission of the audio data or commands associated with an audio output. Continuing the example, a second Bluetooth communication link 112 may be used to transmit time synchronization commands, timestamps, and other time data that may be used to synchronize the output generated by the audio devices. In some implementations, the additional concurrent link may be used to transmit non-audio or non-video data simultaneous with the transmission of data associated with an audio or video output using the first Bluetooth communication link 112.

At 226, the distributing master device 110 may be caused to transmit the data to at least one other device within the group of devices using a second band of the first protocol. For example, the distributing master device 110 may be configured to function as a software-based Wi-Fi access point and may transmit data to other devices via unicast or multicast transmissions. Because the distributing master device 110 may not communicate directly with the access point 102 to receive the data, the distributing master device 110 may transmit the data to other devices using a band that differs from that used by the access point 102. For example, the access point 102 may transmit data associated with a 2.4 GHz band, while the distributing master device 110 may transmit the data to other devices using a 5 GHz band. In some implementations, the distributing master device 110, or another computing device in communication with the distributing master device 110, may select a particular channel of the frequency band to be used. For example, a congestion value or a number of devices associated with a first channel may be less than the congestion values or numbers of devices associated with other channels. As a result, the first channel may be used by the distributing master device 110 to transmit data.

Figure 3:
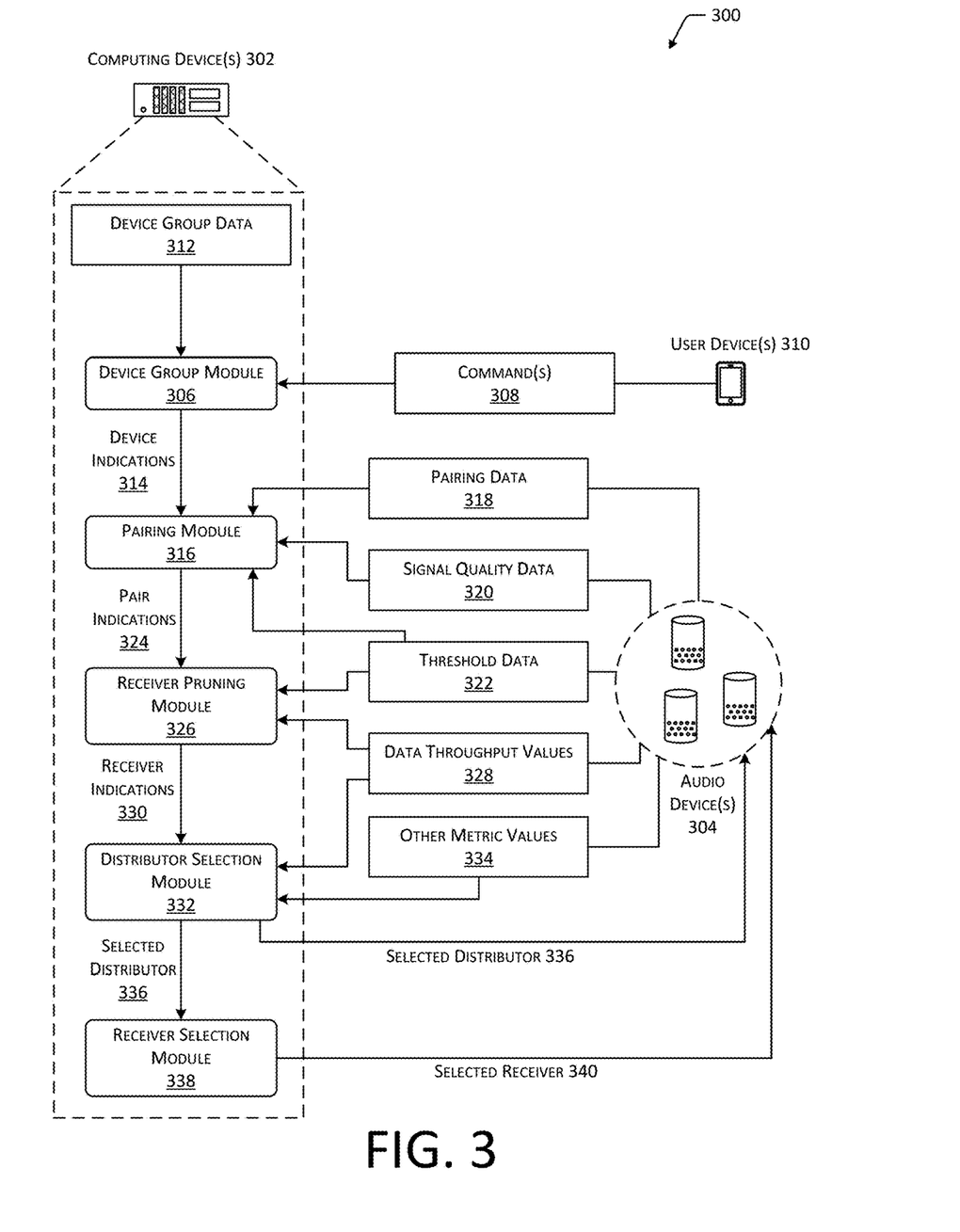
FIG. 3 depicts an implementation of a system for selecting a pair of devices to distribute data to other devices.

FIG. 3 depicts an implementation of a system 300 for selecting a pair of devices to distribute data to other devices. Processes for selecting devices for use as receiving master devices 108 and distributing master devices 110 may be performed using one or more computing devices 302. In some implementations, the computing device(s) 302 may include one or more of the audio devices 304 from which the receiving master device 108 and distributing master device 110 are selected. In other implementations, the computing device(s) 302 may include one or more servers or other types of computing devices 302 in communication with at least one of the audio devices 304, such as via one or more access points 102. In still other implementations, the computing device(s) 302 may include one or more devices, other than the audio devices 304, that may communicate with the audio devices 304 via a local area network. For example, the computing device(s) 302 may include one or more personal computers (e.g., desktop or laptop computers), portable computing devices (e.g., smartphones, notebooks, tablet computers, palm-top computers), wearable computing devices, automotive computing devices, gaming systems, smart televisions, set-top boxes, and so forth.

A device group module 306 associated with the computing device(s) 302 may receive one or more commands 308 from a user device 310. The command(s) 308 may be configured to cause generation of an audio output, or other type of output, using one or more audio devices 304 or other devices. For example, a command 308 may indicate a particular group of audio devices 304 and particular audio data to be used to generate an output. In some implementations, the command 308 may be provided directly to an audio device 304 or to the computing device 302, and use of a separate user device 310 may be omitted. In other implementations, the user device 310 may be a separate device from the audio devices 304 or computing device 302, and may include any of the types of devices described with regard to the computing device(s) 302.

The device group module 306 may determine correspondence between the command(s) 308 and device group data 312. The device group data 312 may associate particular audio devices 304 with particular device groups. For example, an identifier associated with an audio device 304 may be stored in association with at least one identifier associated with at least one device group. Based on the correspondence between the command(s) 308 and the device group data 312, the device group module 306 may determine one or more device indications 314 that indicate particular audio devices 304 associated with the command(s) 308.

A pairing module 316 associated with the computing device(s) 302 may receive pairing data 318 from the indicated audio devices 304 or access existing pairing data 318. The pairing data 318 may indicate particular audio devices 304 that may communicate with other audio devices 304 using a particular protocol. For example, the pairing data 318 may indicate audio devices 304 that are capable of establishing Bluetooth communication links 112 with particular other audio devices 304. In some implementations, the pairing data 318 may be determined by causing one or more of the audio devices 304 to detect other audio devices 304 with which a communication link may be established. For example, one or more audio devices 304 may initiate a Bluetooth pairing mode to discover other audio devices 304 with which a Bluetooth communication link 112 may be established.

The pairing module 316 may also determine signal quality data 320 from the audio devices 304. Signal quality data 320 may indicate a signal strength or other indication of signal quality, such as an error rate, data transfer rate, signal to noise ratio, and so forth, associated with communications between pairs of audio devices 304. The pairing module 316 may determine correspondence between the signal quality data 320 and threshold data 322, which may indicate a minimum threshold signal quality value for an audio device 304 to be used as a receiving master device 108 or distributing master device 110. Based on the device indications 314 and pairing data 318, the pairing module 316 may determine pairs of indicated audio devices 304 that are capable of establishing Bluetooth communication links 112 or communication links using another protocol. Based on correspondence between the signal quality data 320 and the threshold data 322, the pairing module 316 may determine a set of device pairs having a signal quality sufficient to function as a receiving master device 108 and distributing master device 110. The pairing module 316 may generate pair indications 324 indicative of the set of device pairs.

A receiver pruning module 326 associated with the computing device(s) 302 may determine data throughput values 328 associated with the audio devices 304 indicated in the pair indications 324. For example, at least a subset of the audio devices 304 indicated in the pair indications 324 may communicate with an access point 102. A data throughput value 328 associated with communication between an audio device 304 and the access point 102 may indicate the suitability of the audio device 304 for use as a receiving master device 108 that receives audio data from the access point 102. For example, the data throughput value 328 may indicate a data transfer rate between the access point 102 and the audio device 304. The receiver pruning module 326 may determine correspondence between the data throughput values 328 for the audio devices 304 indicated in the pair indications 324 and threshold data 322, which may indicate a threshold minimum data throughput value for use as a receiving master device 108. Based on the correspondence, the receiver pruning module 326 may generate receiver indications 330 indicative of the audio devices 304 that may be used as a receiving master device 108.

A distributor selection module 332 associated with the computing device(s) 302 may determine a set of the audio devices 304 capable of forming Bluetooth communication links 112, or communication links using another protocol, with the audio devices 304 indicated in the receiver indications 330. Based on the data throughput values 328 or other metric values 334 associated with the set of audio devices 304, the distributor selection module 332 may determine a particular audio device 304 for use as the distributing master device 110. As described previously, example processes for selecting an audio distribution master device from a group of audio devices are described in U.S. patent application Ser. Nos. 15/246,070; 15/651,450; 15/421,014; 15/357,579; 15/373,677; and Ser. No. 15/245,897, each of which has been incorporated by reference previously. For example, other metric values 334 for determining an audio distribution master device may include numbers of other devices that may receive data from a distributing master device 110, signal quality values such as RSSI, SNR, PER, RCPI, MCS value, and so forth.

Based on the selected distributor 336 indicated by the distributor selection module 332, a receiver selection module 338 associated with the computing device(s) 302 may determine a receiving master device 108 for use with the distributing master device 110. For example, if multiple audio devices 304 are capable of establishing a Bluetooth communication link 112 with the selected distributing master device 110, the receiver selection module 338 may determine a particular audio device 304 having the greatest signal quality for communication with the selected distributing master device 110, based on the signal quality data 320. Indications of the selected distributor 336 and selected receiver 340 may be provided to one or more of the audio devices 304 to cause the selected audio devices 304 to begin functioning as the receiving master device 108 and distributing master device 110.

In some implementations, the distributor selection module 332 may also determine which of the audio devices 304 may receive data from the selected distributor 336 and may provide an indication of the audio devices 304 to the receiver selection module 338. The receiver selection module 338 may determine one or more audio devices 304 that are unable to receive data from the distributing master device 110 and may provide an indication of these audio devices 304 to the receiving master device 108. The receiving master device 108 may be configured to provide data to audio devices 304 that are unable to receive data from the distributing master device 110, such as via Wi-Fi communication link 106 with an access point 102.

Figure 4:
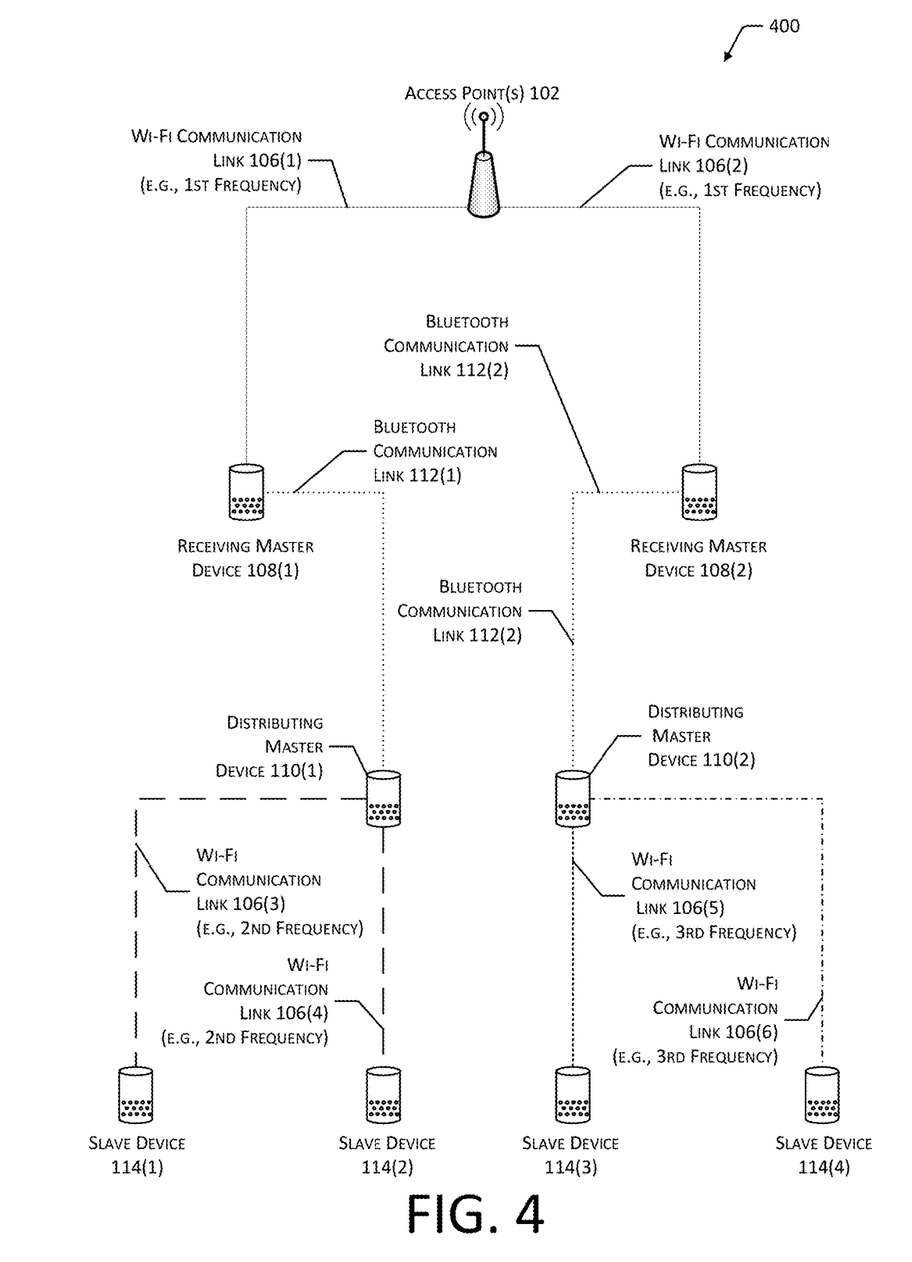
FIG. 4 depicts an implementation of a system for distributing data to devices using multiple pairs of receiving and distributing master devices.

FIG. 4 depicts an implementation of a system 400 for distributing data to devices using multiple pairs of receiving and distributing master devices. As described with regard to FIG. 1, data may be distributed to a group of audio devices 304, or other types of devices, using a receiving master device 108 and a distributing master device 110. Specifically, a receiving master device 108 may receive data via an access point 102 using a first band of a first protocol, such as a 2.4 GHz band associated with a Wi-Fi network. The receiving master device 108 may then transmit the data to a distributing master device 110 using a second protocol, such as Bluetooth. The distributing master device 110 may then distribute the data to one or more other devices using a different band associated with the first protocol, such as a 5 GHz Wi-Fi band.

In some cases, each device associated with an output may not be able to receive data from a particular distributing master device 110. For example, a particular device may be positioned beyond a range at which data may be received form one of the other devices, one or more objects may be positioned between the particular device and the other devices, network interference or other network conditions may hinder receipt of data by the particular device, and so forth. In some cases, devices that are unable to receive data from a distributing master device 110 or that are unable to receive data from a distributing master device 110 at a selected minimum data transfer rate may instead receive data from a receiving master device 108 via the access point 102. However, in other cases, the process described with regard to FIGS. 1-3 may be performed multiple times to determine two or more pairs of devices that may function as a receiving master device 108 and distributing master device 110. For example, a first distributing master device 110(1) may transmit data to a first group of slave devices 114, while a second distributing master device 110(2) transmits data to a second group of slave devices 114. Continuing the example, after determining a first receiving master device 108(1) and distributing master device 110(1) that communicates with a first subset of audio devices 304, the process described with regard to FIGS. 2 and 3 may be repeated using the remaining audio devices 304 that do not communicate with the first distributing master device 110(1). Performance of the process a second time may enable a second receiving master device 108(2) and distributing master device 110(2) to be determined, and for the second distributing master device 110(2) to provide data to at least a subset of the remaining audio devices 304.

In the example system 400 of FIG. 4, a first receiving master device 108(1) may receive data from an access point 102 via a first Wi-Fi communication link 106(1), and a second receiving master device 108(2) may receive data from the access point 102 via a second Wi-Fi communication link 106(2). The first Wi-Fi communication link 106(1) and the second Wi-Fi communication link 106(2) may be associated with a first band of the Wi-Fi network, such as a 2.4 GHz band. The first receiving master device 108(1) may transmit the data to a first distributing master device 110(1) via a first Bluetooth communication link 112(1). The second receiving master device 108(2) may transmit the data to a second distributing master device 110(2) via a second Bluetooth communication link 112(2).

The first distributing master device 110(1) may then transmit the data to one or more slave devices 114. For example, FIG. 4 depicts the first distributing master device 110(1) in communication with a first slave device 114(1) via a third Wi-Fi communication link 106(3), and with a second slave device 114(2) via a fourth Wi-Fi communication link 106(4). The third Wi-Fi communication link 106(3) and the fourth Wi-Fi communication link 106(4) may be associated with a band that differs from that associated with the access point 102. For example, the band used by the distributing master devices 110 may be a 5 GHz band, while the band used by the access point 102 may be a 2.4 GHz band. The second distributing master device 110(2) may transmit data to a third slave device 114(3) via a fifth Wi-Fi communication link 106(5) and to a fourth slave device 114(4) via a sixth Wi-Fi communication link 106(6). The fifth Wi-Fi communication link 106(5) and the sixth Wi-Fi communication link 106(6) may also be associated with the same band used by the first distributing master device 110(1), or with a different band from both the band used by the access point 102 and that used by the first distributing master device 110(1). For example, FIG. 4 depicts the fifth Wi-Fi communication link 106(5) and the sixth Wi-Fi communication link 106(6) associated with a third band that differs from the bands used by the access point 102 and by the first distributing master device 110(1).

Figure 5:
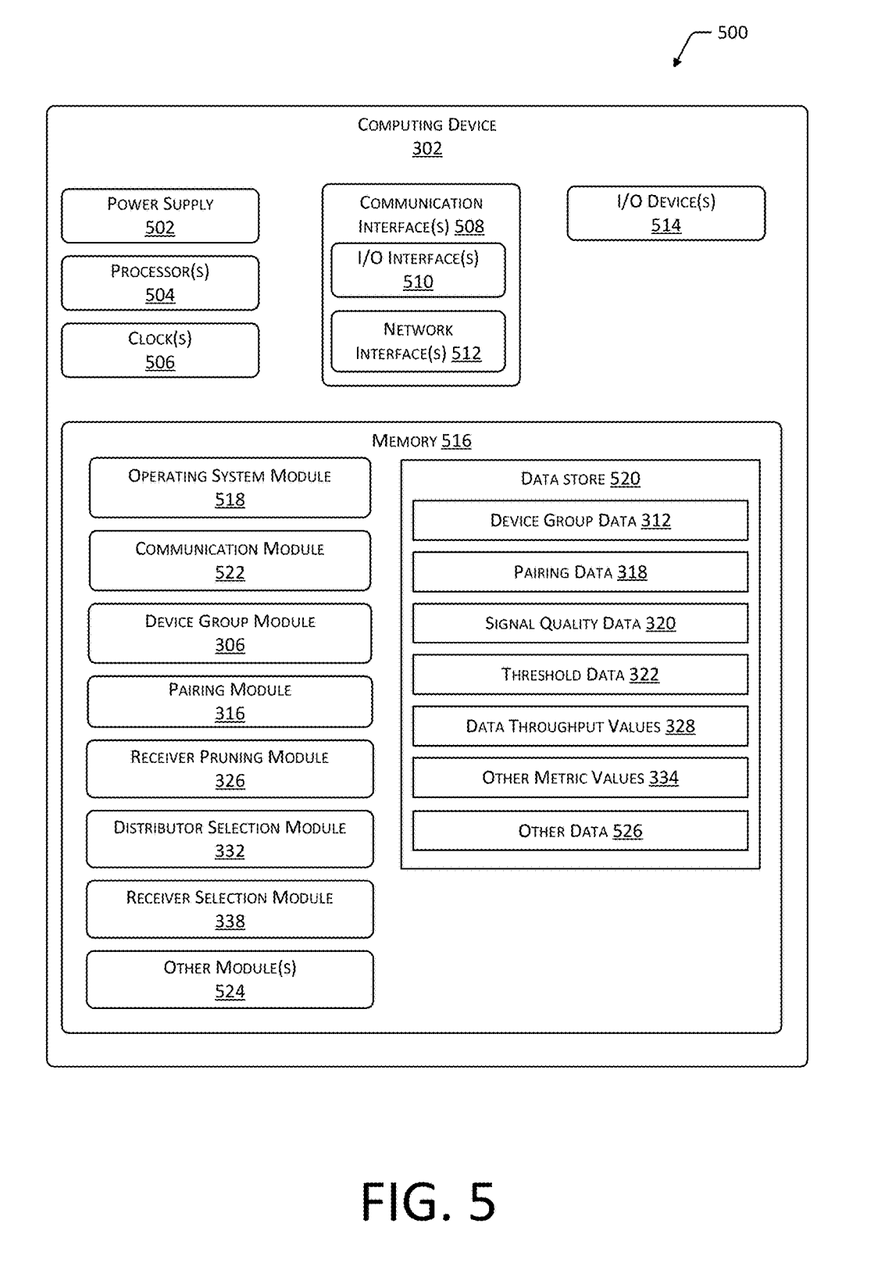
FIG. 5 is a block diagram depicting a computing device within the scope of the present disclosure.

FIG. 5 is a block diagram 500 depicting a computing device 302 within the scope of the present disclosure. As described with regard to FIG. 3, the computing device 302 may include one or more audio devices 304, user devices 310, servers, or other types of computing devices 302 in communication with the audio device(s) 304. Additionally, while FIG. 5 depicts a single computing device 302, in other implementations, the functions described with regard to the computing device 302 may be performed by any number and any type of computing devices 302.

One or more power supplies 502 may be configured to provide electrical power suitable for operating the computing device 302. In some implementations, the power supply 502 may include a rechargeable battery, fuel cell, photovoltaic cell, power conditioning circuitry, and so forth.

The computing device 302 may include one or more hardware processor(s) 504 (processors) configured to execute one or more stored instructions. The processor(s) 504 may include one or more cores. One or more clocks 506 may provide information indicative of date, time, ticks, and so forth. For example, the processor(s) 504 may use data from the clock 506 to generate a timestamp, trigger a preprogrammed action, and so forth.

The computing device 302 may include one or more communication interface(s) 508, such as input/output (I/O) interface(s) 510, network interface(s) 512, and so forth. The communication interfaces 508 may enable the computing device 302, or components of the computing device 302, to communicate with other computing devices 302 or components thereof. The I/O interface(s) 510 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 510 may couple to one or more I/O device(s) 514. The I/O devices 514 may include any manner of input device or output device associated with the computing device 302 or with another computing device 302 in communication therewith. For example, I/O devices 514 may include touch sensors, keyboards, mouse devices, microphones, image sensors (e.g., cameras), scanners, displays, speakers, haptic devices, printers, motion sensors, location sensors, and so forth. In some implementations, the I/O device(s) 514 may be physically incorporated with a computing device 302 or may be externally placed.

The network interface(s) 512 may be configured to provide communications between the computing device 302 and other devices, such as the I/O devices 514, routers, access points, and so forth. The network interface(s) 512 may include devices configured to couple to one or more networks, including local area networks (LANs), wireless LANs, wide area networks (WANs), wireless WANs, and so forth. For example, the network interfaces 512 may include computing devices 302 compatible with Ethernet, Wi-Fi, Wi-Fi Direct, Bluetooth, Bluetooth Low Energy, ZigBee, Z-Wave, 3G, 4G, LTE, and so forth.

The computing device 302 may include one or more busses or other internal communications hardware or software that allows for the transfer of data between the various modules and portions of the computing device 302.

As shown in FIG. 5, the computing device 302 may include one or more memories 516. The memory 516 may include one or more computer-readable storage media (CRSM). The CRSM may be any one or more of an electronic storage medium, a magnetic storage medium, an optical storage medium, a quantum storage medium, a mechanical computer storage medium, and so forth. The memory 516 may provide storage of computer-readable instructions, data structures, program modules, and other data for the operation of the computing device 302. A few example modules are shown stored in the memory 516, although the same functionality may alternatively be implemented in hardware, firmware, or as a system on a chip (SoC).

The memory 516 may include one or more operating system (OS) modules 518. The OS module 518 may be configured to manage hardware resource devices such as the I/O interfaces 510, the network interfaces 512, the I/O devices 514, and to provide various services to applications or modules executing on the processor(s) 504. The OS module 518 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 520 and one or more of the following modules may also be stored in the memory 516. The modules may be executed as foreground applications, background tasks, daemons, and so forth. The data store 520 may use a flat file, database, linked list, tree, executable code, script, or other data structure to store information. In some implementations, the data store 520 or a portion of the data store 520 may be distributed across one or more other devices including other computing devices 302, network attached storage devices, and so forth.

A communication module 522 stored in the memory 516 may be configured to establish communications with other computing devices 302.

The memory 516 may also store the device group module 306. The device group module 306 may access device group data 312 that associates particular devices with particular groupings of devices. The device group module 306 may also determine correspondence between commands 308 that are received and the device group data 312. For example, a command 308 may indicate a particular output to be generated by a particular group of devices. Correspondence between the command 308 and the device group data 312 may indicate the particular devices associated with the indicated group.

The memory 516 may additionally store the pairing module 316. The pairing module 316 may access pairing data 318 that indicates particular devices that may communicate with other devices using a selected protocol, such as Bluetooth. In some implementations, the pairing data 318 may include existing data indicative of device pairings. In other implementations, the pairing module 316 may cause one or more devices to initiate a pairing mode and determine other devices with which a communication link may be established. The pairing module 316 may also determine signal quality data 320 indicative of the signal strength or other characteristics of communications between pairs of devices. The pairing module 316 may further determine correspondence between the signal quality data 320 and threshold data 322 indicative of a threshold minimum signal quality value. Based on the correspondence, the pairing module 316 may determine pairs of devices that are eligible to function as a receiving master device 108 and distributing master device 110. Devices having signal quality values less than a threshold minimum signal quality value may not be suitable for use as the receiving master device 108 and distributing master device 110. For example, two devices having a RSSI value for Bluetooth communication below a corresponding threshold value may not distribute audio data to other devices at a minimum data transfer rate suitable for generating an output having a minimum quality (e.g., a minimum bit rate, minimum sample size, or maximum count or percentage of lost data packets).

The memory may further store the receiver pruning module 326. The receiver pruning module 326 may determine data throughput values 328 associated with one or more devices. For example, the receiver pruning module 326 may receive an indication of particular devices that are eligible for use as the receiving master device 108 or distributing master device 110 from the pairing module 316 and may determine a data throughput value 328 for each device indicative of a data transfer rate for communications between the device and an access point 102. The receiver pruning module 326 may also determine correspondence between the data throughput values 328 and threshold data 322 indicative of a minimum data throughput value or minimum data transfer rate. Based on the correspondence, the receiver pruning module 326 may determine devices that are eligible to function as a receiving master device 108. Devices having a data throughput value 328 less than a threshold minimum value may not be suitable for use as a receiving master device 108. For example, devices having a data throughput value 328 less than a threshold minimum value may not support a minimum data transfer rate suitable for generating an output having a minimum quality.

The memory 516 may also store the distributor selection module 332. The distributor selection module 332 may determine, based on the pairing data 318, devices that may communicate, via a selected protocol, with the eligible receiving master devices 108 determined by the receiver pruning module 326. For example, at least a subset of the eligible receiving master devices 108 may be capable of establishing a Bluetooth communication link 112 with one or more other devices. Based on one or more of the signal quality data 320, threshold data 322, data throughput values 328, or other metric values 334, the distributor selection module 332 may determine a particular device for use as a distributing master device 110. For example, one method by which a distributing master device 110 may be determined for a group of devices is described in U.S. patent application Ser. No. 15/421,014, incorporated by reference previously.

The memory 516 may additionally store the receiver selection module 338. The receiver selection module 338 may determine, based on the pairing data 318, one or more devices capable of communicating, via the selected protocol, with the selected distributing master device 110. The receiver selection module 338 may also determine, based on the signal quality data 320, a particular device of the one or more devices having the greatest signal quality for communication with the distributing master device 110, and begin using the selected device as a receiving master device 108.

Other modules 524 may also be present in the memory 516. For example, other modules 524 may include user interface modules for receiving user input selecting audio data for output, particular audio devices 304 for use, and so forth. Other modules 524 may also include encryption modules to encrypt and decrypt communications between computing devices 302. Other modules 524 may also include configuration modules to receive and modify user settings, configurations, and preferences, default settings, and so forth.

Other data 526 within the data store 520 may include default configurations and settings associated with computing devices 302, security data, such as encryption keys and schema, access credentials, and so forth. Other data 526 may include rules and algorithms for selecting distributing master devices 110, weights for data throughput values 328, signal quality data 320, and other metric values 324, and so forth.

In different implementations, different computing devices 302 may have different capabilities or capacities. For example, servers may have significantly more processor 504 capability and memory 516 capacity compared to the processor 504 capability and memory 516 capacity of audio devices 304.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a first audio device;
   a second audio device, wherein the first audio device and the second audio device communicate using a first Bluetooth communication link;
   a third audio device;
   a fourth audio device, wherein the third audio device and the fourth audio device communicate using a second Bluetooth communication link;
   a computing device in communication with the first audio device, the second audio device, the third audio device, and the fourth audio device, wherein the computing device includes one or more memories storing computer-executable instructions and one or more hardware processors to execute the computer-executable instructions to:
      establish, using the first audio device, a first Wi-Fi communication link between the first audio device and an access point;
      establish, using the second audio device, a second Wi-Fi communication link between the second audio device and the access point;
      establish, using the third audio device, a third Wi-Fi communication link between the third audio device and the access point;
      establish, using the fourth audio device, a fourth Wi-Fi communication link between the fourth audio device and the access point;
      determine, using one or more of the first audio device or the one or more hardware processors, a first data transfer rate between the access point and the first audio device using a first Wi-Fi channel;
      determine, using one or more of the third audio device or the one or more hardware processors, a second data transfer rate between the access point and the third audio device;
      access, using the one or more hardware processors, a threshold data transfer rate that indicates a minimum data throughput for concurrent Wi-Fi communication and Bluetooth communication by the first audio device;
      determine, using the one or more hardware processors, that the first data transfer rate exceeds the threshold data transfer rate;
      determine, using the one or more hardware processors, that the second data transfer rate exceeds the threshold data transfer rate;
      determine, using one or more of the second audio device or the one or more hardware processors, a first count of audio devices that is accessible by the second audio device;
      determine, using one or more of the fourth audio device or the one or more hardware processors, a second count of audio devices that is accessible by the fourth audio device;
      determine, using the one or more hardware processors, that the first count exceeds the second count;
      terminate, using the third audio device and the fourth audio device, the third communication link and the fourth communication link;
      establish, using the second audio device and the third audio device, a fifth communication link between the second audio device and the third audio device;
      establish, using the second audio device and the fourth audio device, a sixth communication link between the second audio device and the fourth third audio device;
      receive, using the first audio device, audio data from the access point using the first Wi-Fi channel;
      transmit, using the first audio device, the audio data to the second audio device using the first Bluetooth communication link; and
      transmit, using the second audio device, the audio data to at least one of the third audio device or the fourth audio device using a second Wi-Fi channel.

2. The system of claim 1, further comprising computer-executable instructions to:
   initiate a Bluetooth pairing mode using first audio device, the second audio device, the third audio device, and the fourth audio device;
   receive pairing data from the first audio device, the second audio device, the third audio device, and the fourth audio device, wherein the pairing data indicates that the first audio device and the second audio device are configured to establish the first Bluetooth communication link and the third audio device and the fourth audio device are configured to establish the second Bluetooth communication link; and
   determine the first data transfer rate and the second data transfer rate in response to the pairing data.

3. The system of claim 1, further comprising computer-executable instructions to:
   prior to determining the first data transfer rate, determine that a first signal strength of communication signals transmitted using the first Bluetooth communication link exceeds a threshold signal strength, wherein the threshold signal strength corresponds to a minimum data transfer rate associated with a minimum quality of an audio output; and
   prior to determining the second data transfer rate, determine that a second signal strength of communication signals transmitted using with the second Bluetooth communication link exceeds the threshold signal strength.

4. The system of claim 1, further comprising computer-executable instructions to:
   establish a third Bluetooth communication link between the first audio device and the second audio device; and
   use the first audio device to transmit, using the third Bluetooth communication link, one or more commands to the second audio device, wherein the one or more commands control one or more of: output of audio by the second audio device or receipt of the audio data by the second device.

5. A method comprising:
   determining, using one or more hardware processors, a plurality of devices in communication using a first protocol;

receiving, using the one or more hardware processors, pairing data from the plurality of devices, wherein the pairing data indicates at least a first pair of devices of the plurality of devices configured to communicate using a second protocol and a second pair of devices of the plurality of devices configured to communicate using the second protocol;

determining, using the one or more hardware processors, first communication data indicative of a first number of devices associated with the first pair or signal strength of received communication signals associated with the first pair;

determining, using the one or more hardware processors, second communication data indicative of a second number of devices or signal strength of received communication signals associated with the second pair;

determining, using the one or more hardware processors, that the first communication data indicates one or more of a greater number of devices or a greater signal strength of received communication signals associated with the first pair;

causing a first device of the first pair to receive data using a first band of the first protocol;

transmitting, using the first device, the data to a second device of the first pair using the second protocol; and transmitting, using the second device, the data to at least a third device of the plurality of devices using a second band of the first protocol.

6. The method of claim 5, further comprising:
prior to determining the first communication data, determining that a first data throughput value associated with the first pair of devices is greater than a threshold data throughput value.

7. The method of claim 5, further comprising:
determining a first signal strength value associated with communication between the first device and the second device using the second protocol; and
prior to determining the first communication data, determining that the first signal strength value exceeds a threshold signal strength value.

8. The method of claim 5, further comprising:
determining that a fourth device of the plurality of devices is unable to receive the data from the second device using the second band of the first protocol; and
providing the data to the fourth device using the first band of the first protocol.

9. The method of claim 8, further comprising:
transmitting, using the fourth device, the data to a fifth device of the plurality of devices using the second protocol;
determining that one or more of a first signal strength value or a first data throughput value for communication between the fifth device and the sixth device is greater than one or more of a second data throughput value or a second signal strength value associated with communication from the second device to the sixth device; and
transmitting, using the fifth device, the data to a sixth device of the plurality of devices using the second band of the first protocol.

10. The method of claim 5, further comprising:
determining, based on the pairing data, that the second device is configured to communicate with the first device and the third device using the second protocol;
determining a first signal strength value associated with communication between the first device and the second device;

determining a second signal strength value associated with communication between the first device and the third device; and determining that the first signal strength value is greater than the second signal strength value.

11. The method of claim 5, wherein the second protocol includes a Bluetooth protocol, the method further comprising:
establishing an additional concurrent communication link between the first device and the second device using the second protocol; and
transmitting one or more messages to the second device using the additional communication link, wherein the data includes one or more of audio data or video data for generation of an output and the messages are associated with one or more of non-audio data or non-video data.

12. The method of claim 11, wherein the messages are associated with one or more of control commands or configuration commands for controlling one or more of transmission of the data or generation of the output.

13. The method of claim 11, wherein the additional concurrent communication link includes a Bluetooth Low Energy communication link.

14. A system comprising:
a plurality of devices including a first device and a second device, wherein the plurality of devices communicate using a first protocol;
one or more memories storing computer-executable instructions; and
one or more hardware processors to execute the computer-executable instructions to:
determine, using the one or more hardware processors, a first subset of the plurality of devices configured to communicate with the first device using a second protocol, wherein the first subset includes the second device;
determine, using the one or more hardware processors, communication data indicative of one or more of numbers of devices or signal strength of communication signals associated with the first subset;
based on the communication data, select, using the one or more hardware processors, the second device of the first subset for transmitting data to one or more other devices of the plurality of devices;
determine, using the one or more hardware processors, a second subset of the plurality of devices configured to communicate with the second device using the second protocol, the second subset including the first device;
receive, using the first device, data using a first band of the first protocol;
transmit, using the first device, the data to the second device using the second protocol; and
transmit, using the second device, the data to at least one device of the plurality of devices using a second band of the first protocol.

15. The system of claim 14, further comprising computer-executable instructions to:
prior to determining the first subset of the plurality of devices, determine a data throughput value for communication between the first device and an access point using the first band of first protocol; and
determine that the data throughput value exceeds a threshold data throughput value.

16. The system of claim 14, further comprising computer-executable instructions to:

determine a signal strength value associated with communication signals between the first device and the second device using the second protocol; and determine that the signal strength value exceeds a threshold signal strength value;

wherein the first device is used to receive the data using the first band and transmit the data to the second device using the second protocol in response to the signal strength value exceeding the threshold signal strength value.

17. The system of claim 14, further comprising computer-executable instructions to:

determine a plurality of signal strength values associated with communication signals between the second device and the second subset, wherein each signal strength value is indicative of a signal strength of communication signals using the second protocol between the second device and a respective one of the second subset, and wherein the plurality of signal strength values includes a first signal strength value associated with communication signals between the first device and the second device; and determine that the first signal strength value is greater than each other signal strength value of the plurality of signal strength values;

wherein the first device is used to receive the data using the first band and transmit the data to the second device using the second protocol in response to the first signal strength value being greater than each other signal strength value of the plurality of signal strength values.

18. The system of claim 14, further comprising computer-executable instructions to:

determine that one or more of a congestion value or a number of devices associated with a first channel of the second band is less than one or more congestion values or numbers of devices associated with one or more second channels of the second band; and transmit, using the second device, the data using the first channel of the second band.

19. The system of claim 14, further comprising computer-executable instructions to:

establish a first communication link and a second communication link between the first device and the second device, wherein the first communication link and the second communication link use the second protocol and the data is transmitted using the first communication link; and use the first device to transmit one or more commands associated with one or more of transmission of the data or generation of an output using the second communication link.

20. The system of claim 19, wherein the first communication link includes a Bluetooth communication link and the second communication link includes a Bluetooth Low Energy communication link.

* * * * *

UNITED STATES PATENT AND TRADEMARK OFFICE
CERTIFICATE OF CORRECTION

PATENT NO. : 10,117,286 B1  
APPLICATION NO. : 15/708950  
DATED : October 30, 2018  
INVENTOR(S) : Milos Jorgovanovic Page 1 of 1

It is certified that error appears in the above-identified patent and that said Letters Patent is hereby corrected as shown below:

In the Claims

Column 20; Line 15:  
Currently Reads: the second audio device and the fourth third audio  
Should read: the second audio device and the fourth audio Signed and Sealed this  
First Day of January, 2019

Andrei Iancu  
*Director of the United States Patent and Trademark Office*